United States Patent
Yamamoto

(10) Patent No.: US 10,665,887 B2
(45) Date of Patent: May 26, 2020

(54) ENERGY STORAGE APPARATUS INCLUDING ALIGNING PROJECTION CONTACTING ENERGY STORAGE DEVICES

(71) Applicant: GS Yuasa International Ltd., Kyoto-shi (JP)

(72) Inventor: Yuichiro Yamamoto, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 253 days.

(21) Appl. No.: 15/730,297

(22) Filed: Oct. 11, 2017

(65) Prior Publication Data

US 2018/0102565 A1 Apr. 12, 2018

(30) Foreign Application Priority Data

Oct. 12, 2016 (JP) ................. 2016-201206

(51) Int. Cl.
*H01M 2/10* (2006.01)
*H01M 10/04* (2006.01)
*H01M 2/02* (2006.01)
*H01M 2/18* (2006.01)
*H01M 6/42* (2006.01)

(52) U.S. Cl.
CPC ......... *H01M 10/0413* (2013.01); *H01M 2/02* (2013.01); *H01M 2/10* (2013.01); *H01M 2/1016* (2013.01); *H01M 2/1061* (2013.01); *H01M 2/1072* (2013.01); *H01M 2/1077* (2013.01); *H01M 2/18* (2013.01); *H01M 10/0472* (2013.01); *H01M 10/0486* (2013.01); *H01M 6/42* (2013.01)

(58) Field of Classification Search
None
See application file for complete search history.

(56) References Cited

U.S. PATENT DOCUMENTS

| | | | | |
|---|---|---|---|---|
| 4,309,818 A | * | 1/1982 | Kline | B29C 67/00 225/103 |
| 2006/0093899 A1 | | 5/2006 | Jeon et al. | |
| 2007/0281208 A1 | | 12/2007 | Yoon et al. | |
| 2014/0315071 A1 | | 10/2014 | Tsutsumi et al. | |
| 2015/0069829 A1 | * | 3/2015 | Dulle | B60R 16/03 307/9.1 |
| 2015/0340663 A1 | | 11/2015 | Minagata et al. | |

FOREIGN PATENT DOCUMENTS

| | | |
|---|---|---|
| JP | H 11-250878 A | 9/1999 |
| JP | H 11-345631 A | 12/1999 |
| JP | 2001-256934 A | 9/2001 |

(Continued)

*Primary Examiner* — Lucas J. O'Donnell
(74) *Attorney, Agent, or Firm* — McGinn I. P. Law Group, PLLC

(57) ABSTRACT

An energy storage apparatus including: an outer case having an opening portion; a plurality of energy storage devices arranged in a first direction in the outer case; and a positioning projection disposed on opposedly facing inner side surfaces of the outer case, extending in a second direction substantially orthogonal to the first direction toward a lower side of the outer case opposite from the opening, and being capable of positioning the adjacently disposed energy storage devices at the lower side of the outer case.

19 Claims, 7 Drawing Sheets

(56) References Cited

FOREIGN PATENT DOCUMENTS

| | | | |
|---|---|---|---|
| JP | 2006-202752 | A | 8/2006 |
| JP | 2010-080450 | A | 4/2010 |
| JP | 2011-171176 | A | 9/2011 |
| JP | 2012-015011 | A | 1/2012 |
| JP | 2012-022937 | A | 2/2012 |
| JP | 2013-242967 | A | 12/2013 |
| JP | 2013-251085 | A | 12/2013 |
| JP | 2014-175193 | A | 9/2014 |
| JP | 2015-185396 | A | 10/2015 |
| KR | 10-2014-0104366 | A | 8/2014 |
| WO | WO 2014/002647 | A1 | 1/2014 |

\* cited by examiner

ENERGY STORAGE APPARATUS INCLUDING ALIGNING PROJECTION CONTACTING ENERGY STORAGE DEVICES

CROSS-REFERENCE TO RELATED APPLICATIONS

This application is based on Japanese Patent Application No. 2016-201206, filed on Oct. 12, 2016, the entire contents of which are hereby incorporated by reference.

FIELD

The present invention relates to an energy storage apparatus.

BACKGROUND

Conventionally, there has been known an assembled battery where a leaf spring member is disposed on an inner lower portion of a side wall of a case, and battery cells accommodated in a battery accommodating chamber of the case are positioned by being pushed toward an inner surface of an opposite side wall (see JP 2013-242967 A, for example).

There has been also known a battery module where battery cells are respectively accommodated in respective spaces formed by a plurality of partition walls in a case (see JP 2010-80450 A, for example).

There has been also known a battery pack where a plurality of circular columnar bodies are formed at a center portion of a pack case, and a plurality of columnar bodies are formed on inner surfaces of the pack case thus positioning secondary battery cells accommodated in the pack case by the circular columnar bodies and the columnar bodies (see JP 2011-171176 A, for example).

However, the conventional configurations described in the above-mentioned Patent Literatures exhibit poor assembling operability due to reasons in terms of their structures.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which exhibits excellent assembling operability at the time of inserting energy storage devices in an outer case.

According to an aspect of the present invention, there is provided an energy storage apparatus which includes: an outer case having an opening portion; a plurality of energy storage devices arranged in a first direction in the outer case; and a positioning projection disposed on opposedly facing inner side surfaces of the outer case, extending in a second direction substantially orthogonal to the first direction toward a lower side of the outer case opposite from the opening, and being capable of positioning the adjacently disposed energy storage devices at the lower side of the outer case.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
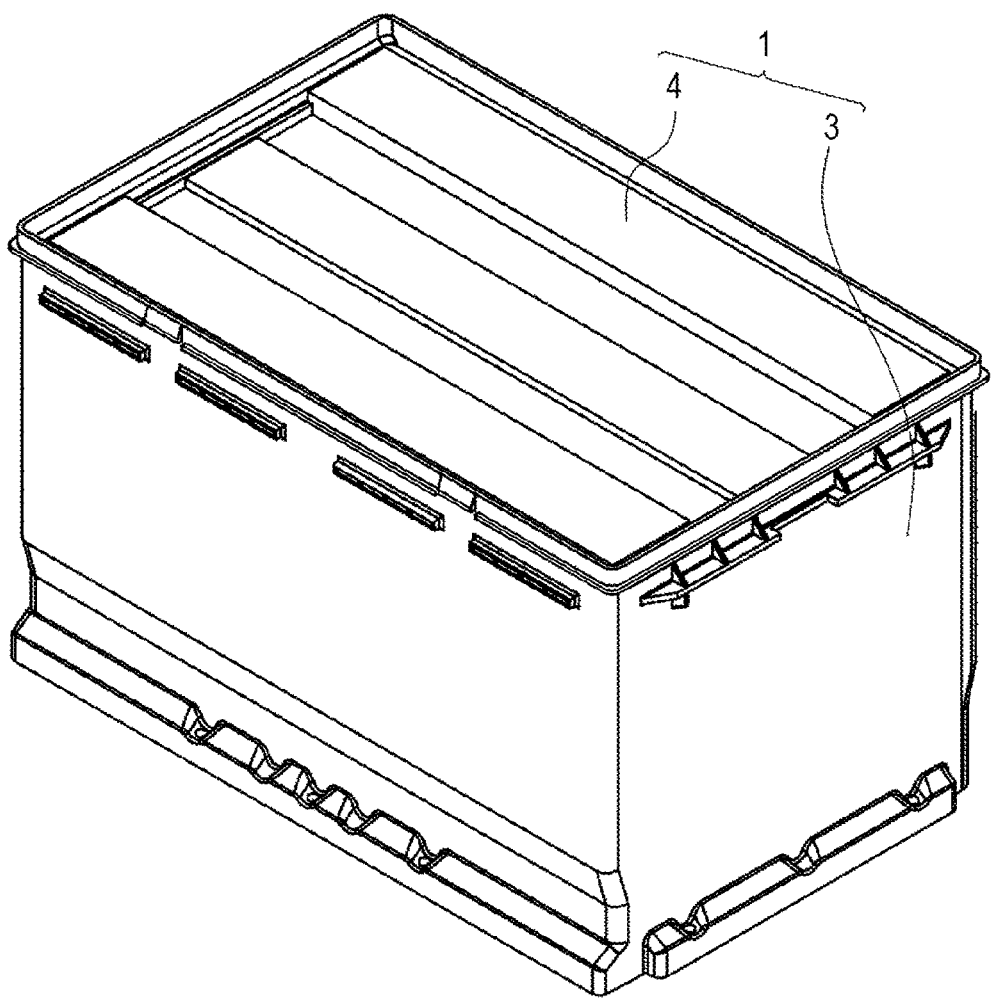
FIG. 1 is a perspective view of an energy storage apparatus according to an embodiment.

According to an aspect of the present invention, there is provided an energy storage apparatus which includes: an outer case having an opening portion; a plurality of energy storage devices arranged in a first direction in the outer case; and a positioning projection disposed on oppositely facing inner side surfaces of the outer case, extending in a second direction substantially orthogonal to the first direction toward a lower side of the outer case opposite from the opening, and being capable of positioning the adjacently disposed energy storage devices at the lower side of the outer case.

With such a configuration, by merely accommodating the energy storage devices in the inside of the outer case, the energy storage devices disposed adjacently to each other can be positioned by the positioning projection. The position at which the positioning projection positions the energy storage devices is the lower side of the outer case. Thus, the positioning projection does not interrupt the insertion of the energy storage devices at an insertion portion of the outer case. Accordingly, an operation of assembling the energy storage devices in the outer case can be performed smoothly.

The outer case is configured such that only the positioning projection is formed on the inner surface of the outer case. Thus, the outer case provides the simple and inexpensive configuration and, at the same time, provides the compact and light-weighted configuration. Further, positioning of the energy storage devices is performed on the lower side of the outer case, so that the positioning projection does not become an obstacle at the time of accommodating the energy storage devices in the inside of the outer case whereby a smooth assembling operation can be realized.

The positioning projection may be brought close to the energy storage device as the positioning projection extends toward the lower side of the outer case.

With such a configuration, the position of the energy storage device can be restricted as the energy storage device is inserted into the outer case and hence, a natural smooth assembling operation can be performed.

The positioning projection may be configured to increase a pressing force to the energy storage device as the positioning projection extends toward the lower side of the outer case.

With such a configuration, a positioning state of the energy storage device can be further strengthened.

The positioning projection may be formed at a plurality of portions along the second direction.

With such a configuration, the outer case can be made more light-weighted by suppressing a volume occupied by the positioning projections.

The energy storage device may have a curved surface on at least a portion of an outer surface thereof, and the positioning projection may be brought into contact with the curved surface of the energy storage device.

With such a configuration, the positioning projection can be brought into contact with the curved surface of the energy storage device where a strength is increased and hence, a defect such as surface deformation can be properly prevented.

The energy storage device may have an approximately rectangular parallelepiped shape, and side surfaces of the energy storage devices disposed adjacently in the first direction may be brought into contact with each other.

With such a configuration, the positional displacement of the energy storage device in the inside of the outer case can be prevented with more certainty.

The energy storage device may have an approximately rectangular parallelepiped shape, the energy storage device may have a curved surface on at least a portion of an outer surface thereof, and the curved surface may be an arcuate surface formed on both end portions of side surfaces of the energy storage devices disposed adjacently in the first direction.

The outer case may include: a body having a bottomed cylindrical shape in which the energy storage devices are accommodated; and a lid body which closes an opening portion of the body, and the positioning projection may be formed on a lower side of the body and the lid body.

With such a configuration, the energy storage device can be positioned at opposite sides thereof and hence, a positioned state of the energy storage device can be made stable.

On the inner side surface of the outer case, an aligning projection which projects in a third direction orthogonal to the first direction and the second direction and is contactable with an end surface of the energy storage device may be formed.

With such a configuration, the energy storage device can be guided not only in a parallelly arranged direction but also in a direction orthogonal to the parallelly arranged direction and hence, the energy storage device can acquire a further stable positioned state.

The aligning projection may be formed on only one of the opposedly facing inner side surfaces of the outer case.

With such a configuration, the position of each energy storage device can be aligned with reference to the one inner side surface.

The aligning projection may be brought close to the energy storage device as the aligning projection extends toward the lower side of the outer case.

With such a configuration, it is possible to bring the aligning projection gradually close to the end surface of the energy storage device as the energy storage device is inserted into the inside of the outer case and hence, an assembling operation can be performed smoothly.

The aligning projection may be formed on a lower half of the inner side surface of the outer case.

With such a configuration, it is possible to perform a further smooth assembling operation.

According to another embodiment of the present invention, there is provided an energy storage apparatus which includes: an outer case having an opening portion; a plurality of energy storage devices arranged in a first direction in the outer case; and a positioning projection disposed on opposedly facing inner side surfaces of the outer case, extending in a second direction substantially orthogonal to the first direction toward a lower side of the outer case, and being capable of positioning the adjacently disposed energy storage devices at the lower side of the outer case, wherein the energy storage device has a terminal on an upper portion thereof, and the terminal mounted on one of the energy storage devices, and the terminal mounted on another one of the energy storage devices be connected to each other by a connecting plate.

With such a configuration, due to the formation of the positioning projection, the energy storage device is positioned at the lower side of the outer case. By adopting the structure where the energy storage device is positioned at the lower side of the outer case, there is no obstacle which interrupts the insertion of the energy storage device at an insertion portion of the outer case. Thus, an operation of assembling the energy storage device in the outer case can be performed smoothly. On the other hand, with only such a configuration, an upper side of the energy storage device may not be firmly fixed by the outer case, that is, the upper side of the energy storage device cannot be easily fixed. In the above-mentioned embodiment, the energy storage devices are positioned by the positioning projection at the lower side of the outer case, and the energy storage devices are positioned by being connected to each other by the connecting plate at the upper side of the outer case. With such a configuration, it is possible to overcome the drawback particular to positioning the energy storage device at the lower side of the outer case that the upper side of the energy storage device cannot be easily fixed. At the same time, it is also possible to acquire an advantageous effect that an operation of assembling the energy storage devices in the outer case can be performed smoothly. Further, the connecting plate has both a function of a conducting member which electrically connects the energy storage devices to each other, and a function of a fixing member which fixes the energy storage devices. Thus, it is unnecessary to prepare parts separately whereby the increase of a manufacturing cost can be obviated.

Hereinafter, embodiments of the present invention are described in detail with reference to attached drawings. In the description made hereinafter, although terms indicative of specific directions and positions (for example, terms including "up", "down", "side", and "end") are used when necessary, these terms are used for merely facilitating understanding of the invention with reference to drawings, and the technical scope of the present invention is not limited by meanings of these terms. Further, the description made hereinafter merely shows an example, and does not intend to limit the present invention, products to which the present invention is applied, or its applications. Further, drawings are schematically shown and hence, ratios of respective sizes and the like may differ from actual ratios of sizes and the like.

Figure 2:
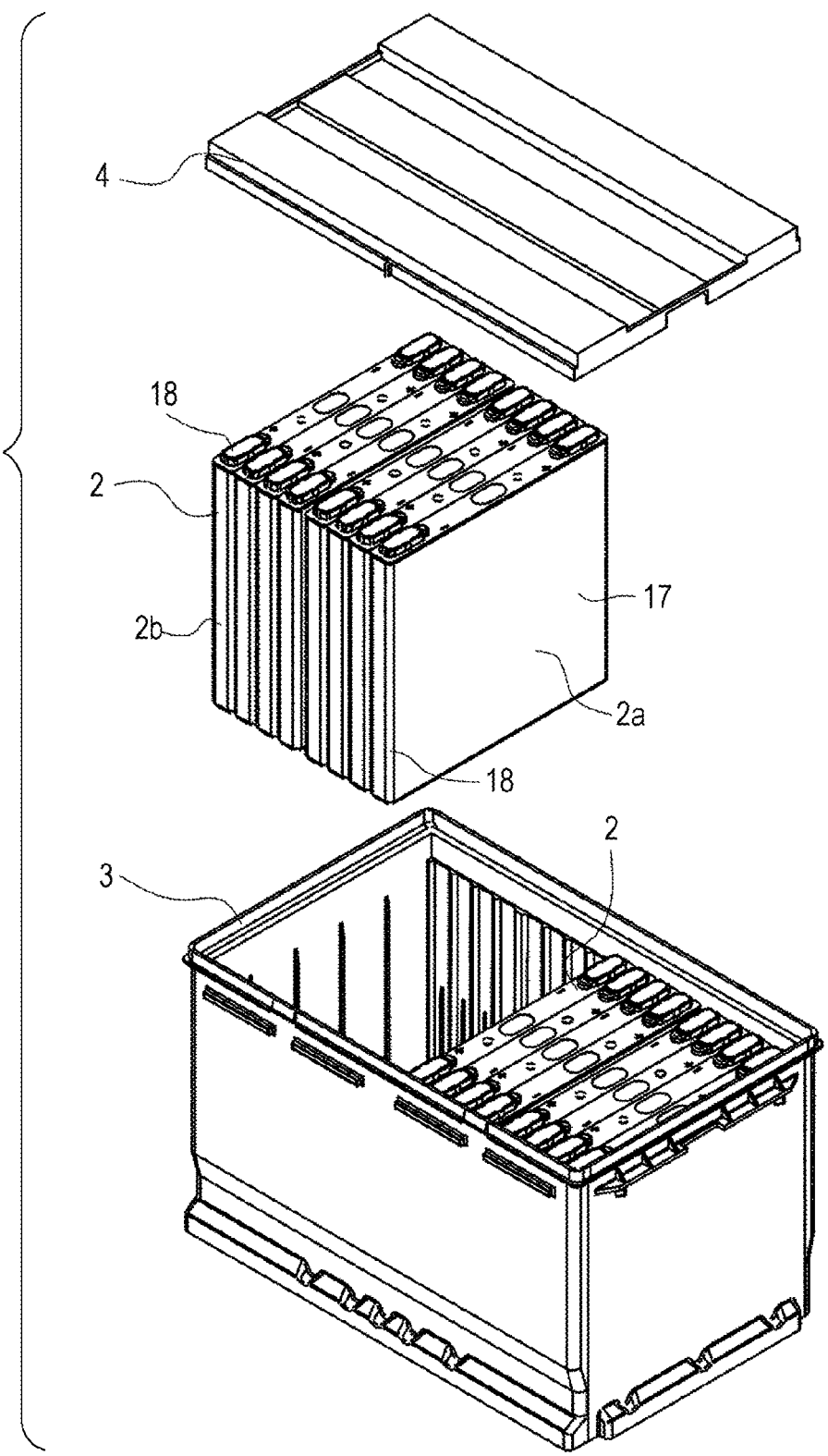
FIG. 2 is an exploded perspective view of the energy storage apparatus shown in FIG. 1.

FIG. 1 shows an external appearance of an energy storage apparatus according to this embodiment. As shown in FIG. 2, the energy storage apparatus includes: an outer case 1; and a plurality of energy storage devices 2 accommodated in the inside of the outer case 1 in a state where the energy storage devices 2 are arranged in a first direction.

The outer case 1 is formed of a body 3 and a lid body 4 both of which are made of a synthetic resin material.

Figure 3:
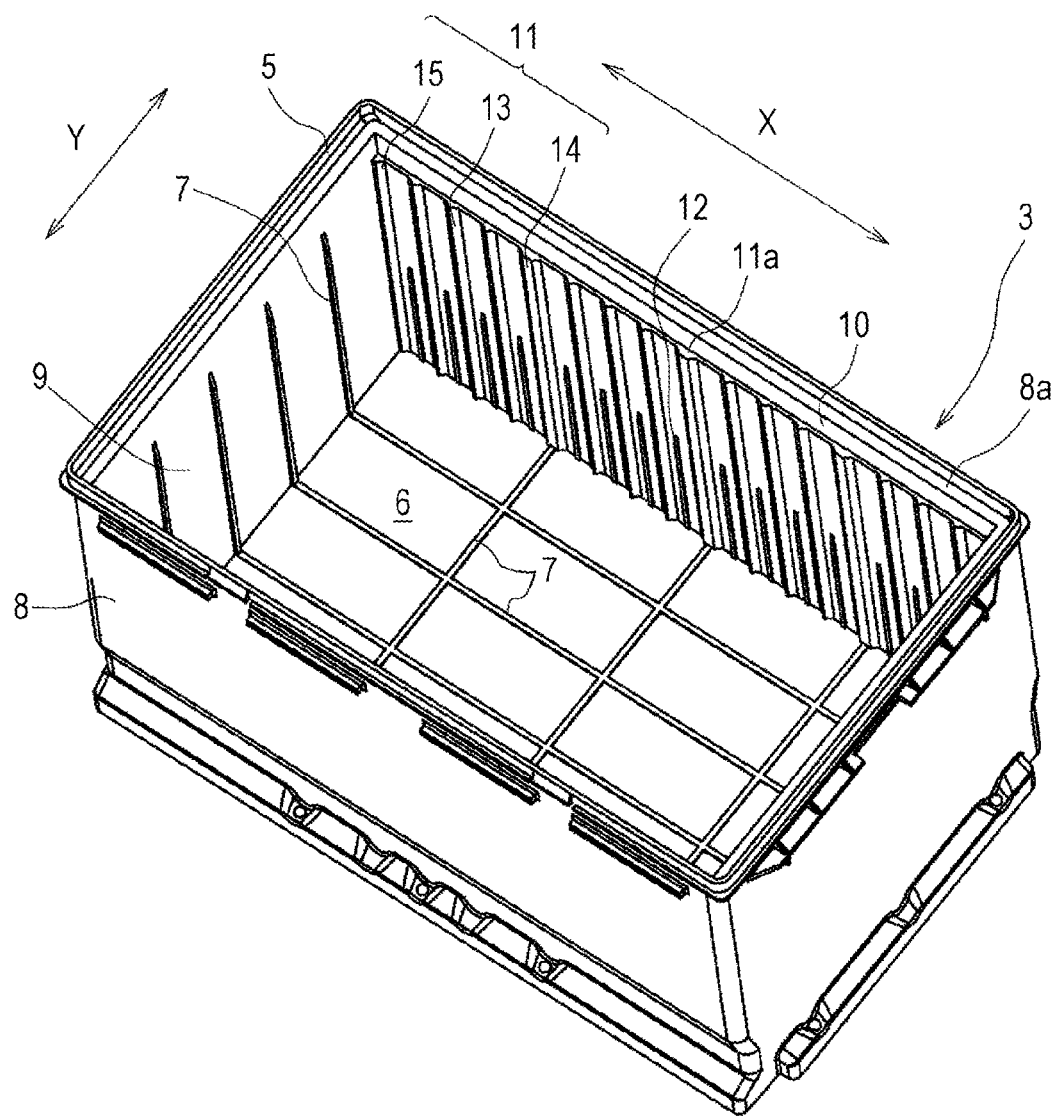
FIG. 3 is a perspective view of a body shown in FIG. 2.

As shown in FIG. 3, the body 3 is a hollow hexahedron (a rectangular parallelepiped in this embodiment) having an opening portion 5 on an upper surface. Ribs 7 in a grid array are formed on upper and lower surfaces of a bottom wall 6 respectively. The ribs 7 extending in a longitudinal direction on the upper surface (bottom portion) of the bottom wall 6 further extend upward on first inner side surfaces 9 which oppositely face each other in the longitudinal direction (a direction indicated by an arrow X in FIG. 3) out of inner peripheral surfaces of a side wall 8. An upper end portion of the opening portion 5 is formed with a small wall thickness, and a portion (end surface 8a) of the side wall 8 is exposed along the opening portion 5.

Further, out of the inner side surfaces of the side wall 8, the second inner side surfaces 10 which oppositely face each other in a lateral direction are inclined such that the second inner side surfaces 10 are gradually brought close to each other as the second inner side surfaces 10 extend toward an upper surface of the bottom wall 6. Positioning projections 11 are formed on the second inner side surfaces 10 such that the positioning projections 11 on one of the second inner side surface 10 oppositely face the positioning projections 11 on the other of the second inner side surfaces 10. Further, aligning projections 12 are formed on the one second inner side surface 10.

Figure 4:
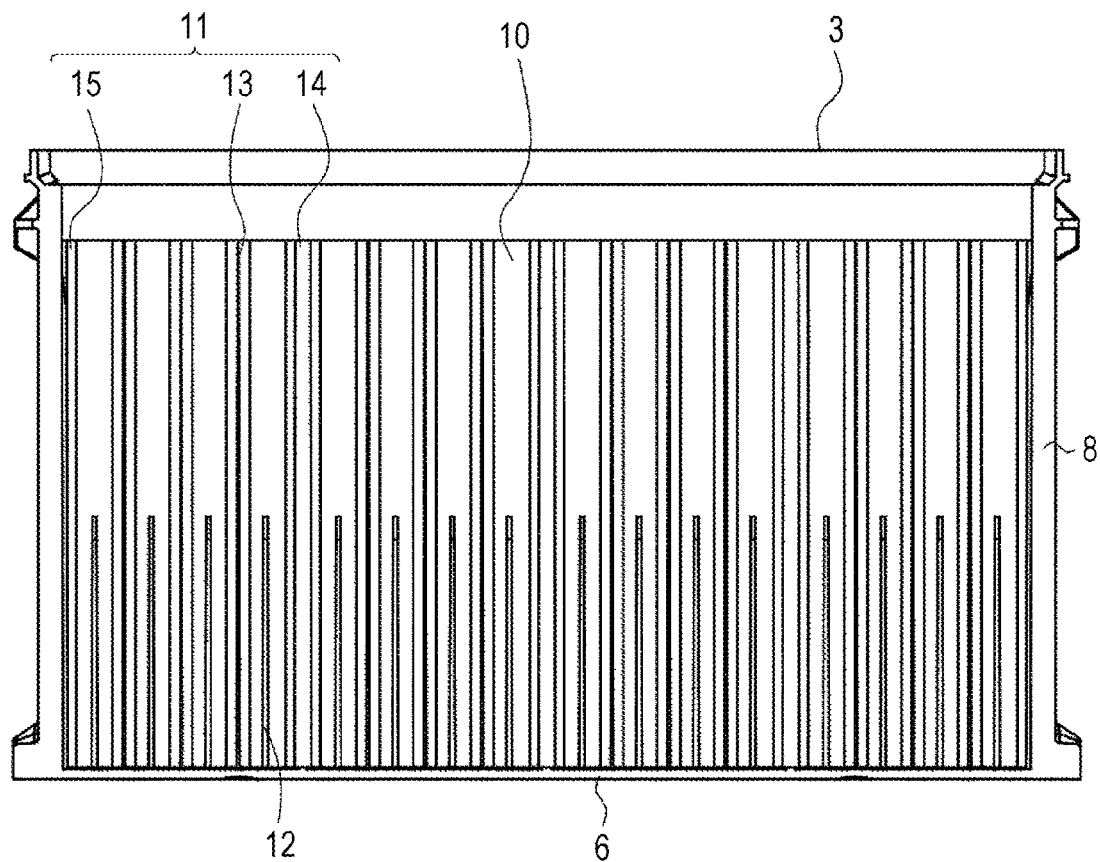
FIG. 4 is a view of a second inner side surface of the body shown in FIG. 3.

The positioning projection 11 is formed in a projecting ridge shape, and extends toward the upper surface of the bottom wall 6 from an upper side on the second inner side surface 10 in a second direction orthogonal to a first direction along which the energy storage devices 2 accommodated in the inside of the body 3 are arranged. As shown in FIG. 4, the positioning projections 11 are formed of first positioning projections 13, second positioning projections 14, and third positioning projections 15. The third positioning projections 15 are respectively disposed on both end portions in the longitudinal direction. The first positioning projections 13 and the second positioning projections 14 are arranged between the third positioning projections 15 in the order of three first positioning projections 13, one second positioning projection 14 and three first positioning projections 13 . . . . Distances between the adjacently disposed projections (a distance between the projections 13 and 13, a distance between the projections 13 and 14) are all set to the same predetermined value. Upper end surfaces 11a of the respective positioning projections 11 are positioned below the end surface 8a of the side wall 8.

Figure 5:
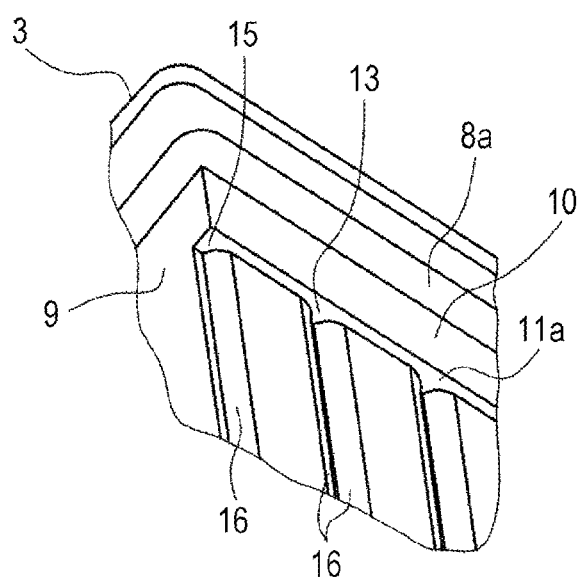
FIG. 5 is a perspective view of upper portions of a first positioning projection and a third positioning projection shown in FIG. 4.
Figure 6:
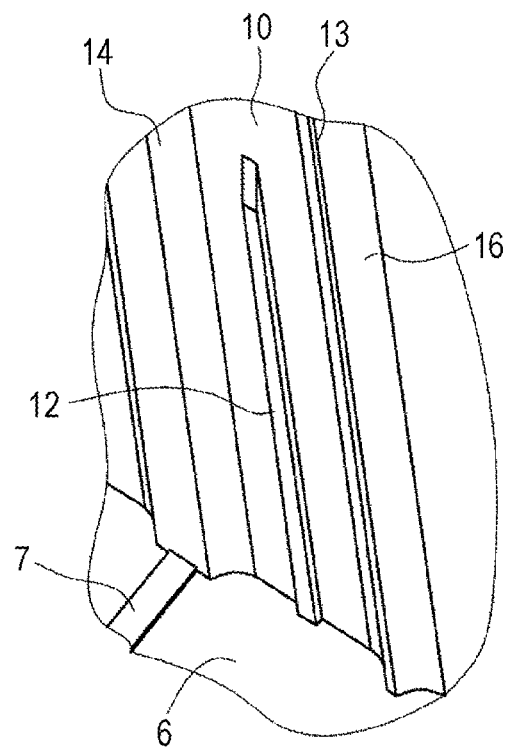
FIG. 6 is a perspective view of an aligning projection shown in FIG. 4.

As shown in FIG. 5 and FIG. 6, a cross section of the first positioning projection 13 on a horizontal plane (plane parallel to an upper surface of the bottom wall 6) (horizontal cross section) has an isosceles trapezoidal shape where a lower bottom is formed on a second inner side surface 10 side, an upper bottom is formed on a side opposite to the second inner side surface 10 side. Surfaces which connect the upper bottom and the lower bottom are hereinafter referred to as "legs". The first positioning projection 13 is formed such that a width of the upper bottom is gradually increased as the first positioning projection 13 extends toward the upper surface of the bottom wall 6. An angle made by the two legs is gradually decreased. That is, inclined surfaces 16 which form the legs are formed such that the inclined surfaces 16 gradually separate from each other as the inclined surfaces 16 extend toward the upper surface of the bottom wall 6. The inclined surfaces 16 are respectively formed of a recessed curved surface and hence, the horizontal cross-sectional shape of the first positioning projection 13 may not completely be an isosceles trapezoid, and may be referred to as an approximately isosceles trapezoid.

A horizontal cross section of the second positioning projection 14 has an isosceles trapezoidal shape where a lower bottom is formed on a second inner side surface 10 side, an upper bottom is formed on a side opposite to the second inner side surface 10 side, and legs are formed by surfaces which connect the upper bottom and the lower bottom to each other. The second positioning projection 14 is formed, in the same manner as the first positioning projection 13, such that a width of the upper bottom is increased as the second positioning projection 14 extends toward the upper surface of the bottom wall 6, an angle made by the two legs is gradually decreased, and inclined surfaces 16 which form the legs gradually separate from each other as the inclined surfaces 16 extend toward the upper surface of the bottom wall 6. The upper bottom of the second positioning projection 14 has a larger width compared to the upper bottom of the first positioning projection 13. The inclined surfaces 16 are respectively formed of a recessed curved surface and hence, the horizontal cross-sectional shape of the second positioning projection 14 may not completely be an isosceles trapezoid, and may be referred to as an approximately isosceles trapezoid.

The third positioning projection 15 is formed in a shape obtained by dividing the shape of the second positioning projection 14 in two at a center portion of the second positioning projection 14 in a width direction.

As described above, each positioning projection 11 has the inclined surfaces 16 which expand in the width direction as the positioning projection 11 extends toward the upper surface of the bottom wall 6. Between the positioning projections 11 disposed adjacently to each other, the inclined surfaces are gradually brought close to each other as the inclined surfaces extend toward the upper surface of the bottom wall 6. With such a configuration, in inserting the energy storage device 2 into the body 3, a gap is formed at the opening portion 5 and hence, the energy storage device 2 can be easily inserted. Further, along with the further insertion of the energy storage device 2, the energy storage device 2 can be positionally restricted in its width direction (lateral direction as viewed in a plan view) and hence, the energy storage device 2 can be positioned in an insertion completed state.

As shown in FIG. 6. the aligning projection 12 is formed in a projecting shape formed on a center portion between the respective positioning projections 11, and extends from the upper surface of the bottom wall 6 of the body 3 to an intermediate position toward the opening portion 5 (that is, the aligning projection 12 being formed on a lower half portion of the second inner side surface 10). Accordingly, a projecting direction of the aligning projection 12 from the second inner side surface 10 becomes a direction orthogonal to the previously-mentioned first direction and the previously-mentioned second direction. Each aligning projection 12 has a rectangular horizontal cross section, and a projecting amount of the aligning projection 12 is gradually increased as the aligning projection 12 extends toward the upper surface of the bottom wall 6. Each aligning projection 12 has a surface (guide surface) on a side opposite to the second inner side surface 10 side. As shown in FIG. 6, an upper end portion of the guide surface has a larger inclination angle with respect to a vertical plane. Provided that the second inner side surfaces 10 are inclined to be brought close to each other as the second inner side surfaces 10 extends downward, a projecting amount of the aligning projection 12 from the second inner side surface 10 may be equal.

With the body 3 having the above-mentioned configuration, the positioning projections 11 and the aligning projections 12 can be easily integrally formed with the body 3 by molding. It is possible to acquire a width size of the positioning projection 11 and a projecting amount of the aligning projection 12 with high accuracy.

The lid body 4 is formed of a plate-like body having a rectangular shape as viewed in a plan view, and a peripheral edge portion of the lid body 4 projects downward. A center portion of an upper surface of the lid body 4 is dented, and portions of the lid body on both sides of a center portion of the lid body 4 in a longitudinal direction are further dented in a groove shape. With such a configuration, spaces in five rows extending in the longitudinal direction are formed on a lower surface side of the lid body 4. These spaces provide spaces for arranging bus bars or the like which electrically connect the energy storage devices. Projections project from center portions of both sides of the lid body 4.

Although the internal configuration of the energy storage device 2 is not shown in the drawing, the energy storage device 2 may be a known energy storage device where an electrode assembly is accommodated in the inside of a container 17 having a rectangular parallelepiped shape made of aluminum, an aluminum alloy or the like, an upper end opening of the container 17 is sealed by a lid, and terminals 18 are exposed from the lid. A side surface 2a and an end surface 2b of the energy storage device 2 are connected to each other by way of an arcuate surface 19 which is an example of a curved surface, and the side surface 2a, the end surface 2b and a bottom surface 2c are also connected to each other by way of the arcuate surface 19.

The energy storage apparatus having the above-mentioned configuration can be assembled as follows.

Figure 7:
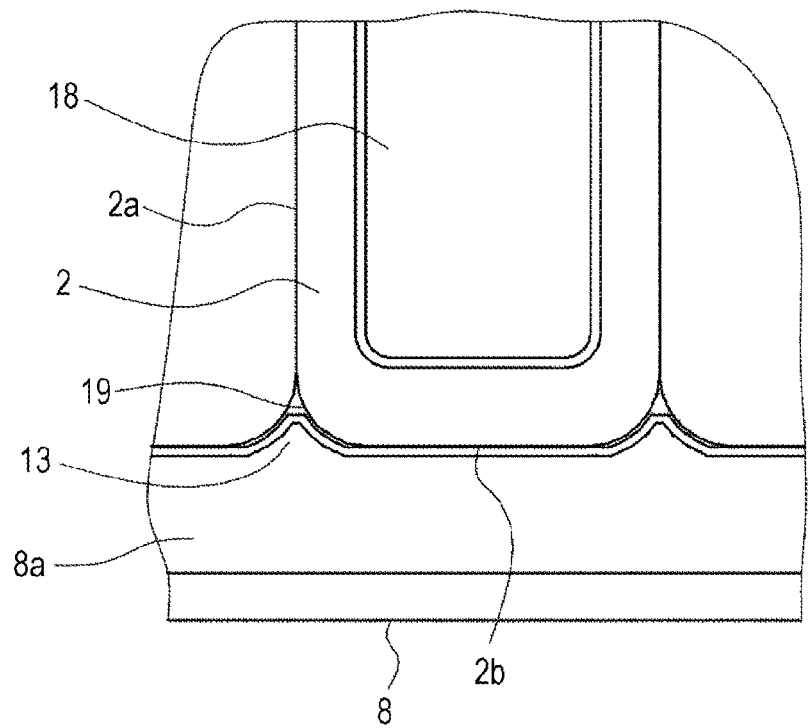
FIG. 7 is a plan view showing the relationship between the positioning projection and the energy storage device as viewed from an opening portion of the body shown in FIG. 2.

That is, in the inside of the body 3 where an adhesive agent is applied by coating to the upper surface of the bottom wall in advance, the respective energy storage devices 2 are accommodated sequentially from one end side. In such an operation, as shown in FIG. 7, while the upper end surfaces 11a of the positioning projections 11 are exposed at the opening portion 5 of the body 3, the positioning projections 11 disposed adjacently to each other are disposed at an interval which allows the formation of a gap with respect to the arcuate surface 19 formed on a corner portion of the energy storage device 2. A distance between the oppositely facing second inner side surfaces 10 is also set to a distance which allows the formation of a gap with respect to the end surface 2b of the energy storage device 2 to be inserted. Accordingly, the energy storage device 2 can be easily inserted so that the energy storage apparatus exhibits excellent assembling operability.

Figure 8:
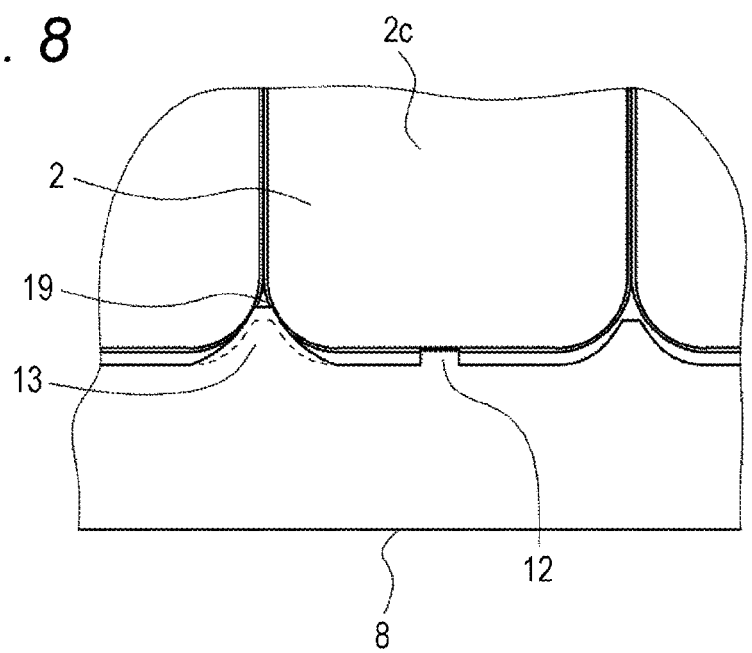
FIG. 8 is a plan view showing the relationship between the positioning projection and the energy storage device on a bottom portion of the body shown in FIG. 2.

The energy storage device 2 inserted into the inside of the body 3 is gradually guided to a center position in a width (lateral) direction (a lateral direction of the energy storage device 2 having a rectangular shape as viewed in a plan view, the same definition being adopted hereinafter) while the arcuate surfaces 19 are guided by the inclined surfaces 16 of the positioning projections 11. When the energy storage device 2 is inserted to an intermediate position, the aligning projection 12 which increases a projecting amount as the aligning projection 12 extends downward is brought into contact with the end surface 2b so that the energy storage device 2 is guided in a longitudinal direction (a longitudinal direction of the energy storage device 2 having a rectangular shape as viewed in a plan view, the same definition being adopted hereinafter). Then, a pressing force which acts on the arcuate surfaces 19 and the end surfaces 2b of the energy storage device 2 from the inclined surfaces 16 of the positioning projections 11 and the guide surface of the aligning projection 12 is gradually increased. As shown in FIG. 8, when the bottom surface of the energy storage device 2 is brought into contact with the upper surface of the bottom wall 6 of the body 3, positioning of the energy storage device 2 is completed. In such a state, the arcuate surfaces 19 of the energy storage device 2 are pressed by the inclined surfaces 16 of the positioning projections 11 so that the energy storage device 2 is positioned in its lateral direction and, at the same time, the end surface of the energy storage device 2 is pressed by the aligning projection 12 so that the energy storage device 2 is positioned in its longitudinal direction. The side surfaces 2a of the energy storage devices 2 disposed adjacently to each other are brought into contact with each other. A gap is formed between the energy storage devices 2 disposed adjacently to each other with the second positioning projections 14 sandwiched therebetween.

When the accommodation of the energy storage devices 2 in the inside of the body 3 is completed, electric wiring is performed using bus bars and the like and, thereafter, the opening portion 5 of the body 3 is closed by the lid body 4. The lid body 4 is disposed in the inside of the body 3 along the first inner side surfaces 9 and the second inner side surfaces 10, and a lower surface of the peripheral edge portion of the lid body 4 is placed on the upper end surfaces 11a of the positioning projections 11. Then, the lid body 4 is slidably moved toward a second inner side surface 10 side so as to bring the projections into contact with the inner surface of the opening portion 5. Lastly, the lid body 4 is integrally joined to the body 3 by welding or the like so that the energy storage apparatus is completed.

As has been described heretofore, according to the energy storage apparatus of this embodiment, the following advantageous effects can be acquired.

(1) At the opening portion of the body 3, a distance between the inclined surfaces 16 of the positioning projections 11 is relatively large in a longitudinal direction, and a gap of an amount equal to a projecting amount of the aligning projection 12 is formed in a lateral direction and hence, an operation of inserting the energy storage device 2 can be performed easily.

(2) In forming the body 3 by molding, the positioning projections 11 and the aligning projections 12 can be integrally formed with the body 3. Accordingly, the body 3 can be formed with the simple configuration which prevents the increase of the number of parts, with substantially no increase of a weight, and with high accuracy.

(3) The positioning projections 11 press the arcuate surfaces 19 having a high strength of the energy storage device 2 and hence, the energy storage device 2 can acquire a stable positioning state without causing a drawback such as deformation of the energy storage device 2.

(4) The energy storage devices 2 can be positioned not only in a lateral direction but also in a longitudinal direction with the use of the aligning projections 12 and hence, the positions of the terminals 18 can be aligned on the same straight line.

The present invention is not limited to the configuration described in the embodiment, and various modifications are conceivable.

Although the outer case 1 is formed of the body 3 and the lid body 4 in the above-mentioned embodiment, the outer case 1 may be formed only of the body 3.

Although the positioning projections 11 are formed only on the body 3 in the above-mentioned embodiment, the positioning projections 11 may be formed not only on the body 3 but also on the lid body 4. With such a configuration, the energy storage device 2 can be positioned not only on a lower side but also on an upper side and hence, it is possible to acquire a more favorable positioning state.

For example, when the positioning projection 11 is formed on an intermediate portion of the second inner side surface 10 of the body 3, the energy storage device 2 can be positioned in a well-balanced manner compared to the case where the positioning projection 11 is formed on the lower half portion of the body. In this case, it is preferable that a range where the energy storage device 2 is pressed by the positioning projection 11 be set long.

Figure 9:
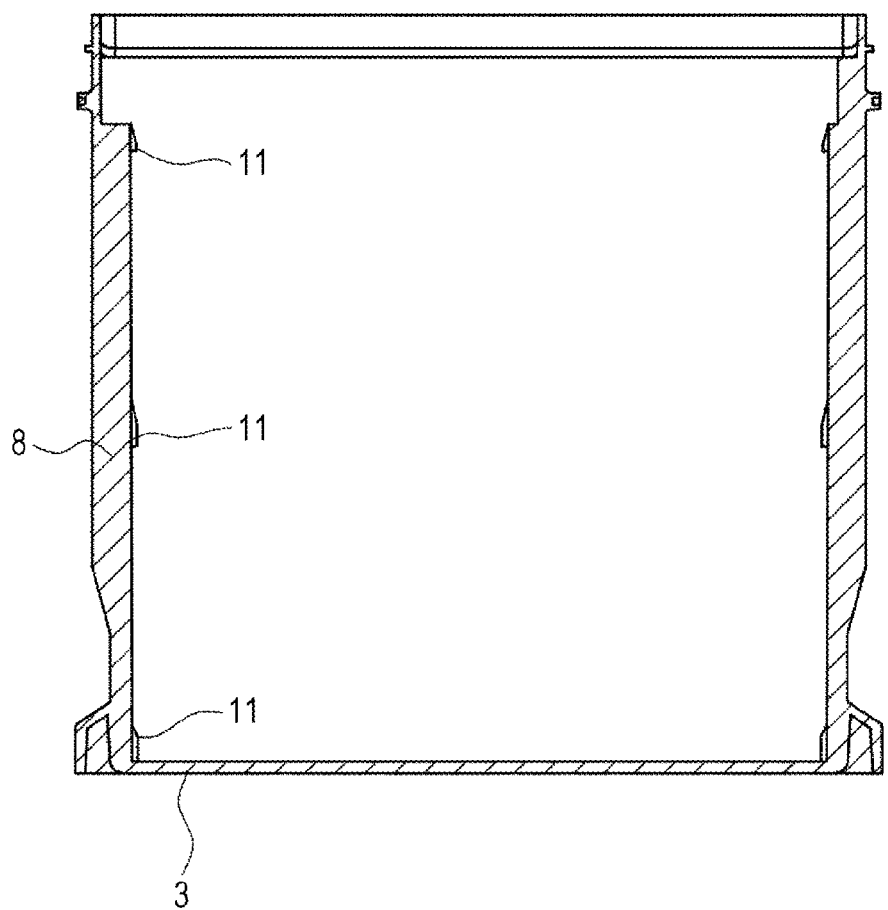
FIG. 9 is a cross-sectional view of a body according to another embodiment.

When the positioning projection 11 is formed on a plurality of portions of the body 3, for example, as shown in FIG. 9, the positioning projection 11 may be formed on three portions, i.e., an upper portion, an intermediate portion and a lower portion. In this case, a projecting amount of the positioning projection 11 positioned on a lower side may be set large so that the energy storage device 2 is positioned in a lateral direction by the positioning projection 11 formed on the lower portion.

In the above-mentioned embodiment, the position at which the aligning projection 12 is formed is set at the lower half portion of the body 3. However, the position at which the aligning projection 12 is formed is not limited to such a position, and may be other places such as an intermediate portion. Further, the aligning projection 12 may be formed at a plurality of portions. Still further, although the aligning projection 12 is formed only on one of the opposedly facing second inner side surface 10, the aligning projection 12 may be formed on both of opposedly facing second inner side surfaces 10.

Although the energy storage device 2 has a rectangular parallelepiped shape in the above-mentioned embodiment, besides a cubic shape, various profiles such as a circular columnar shape can be adopted. When the energy storage device 2 has a circular columnar shape, a portion of an outer peripheral surface of the energy storage device 2 is formed into a curved surface positioned by the positioning projection 11.

Although the energy storage device 2 is positioned at the portion of the outer case 1 on a lower side by the positioning projections 11 in the above-mentioned embodiment, the energy storage device 2 can be also positioned by the following configurations.

Figure 10:
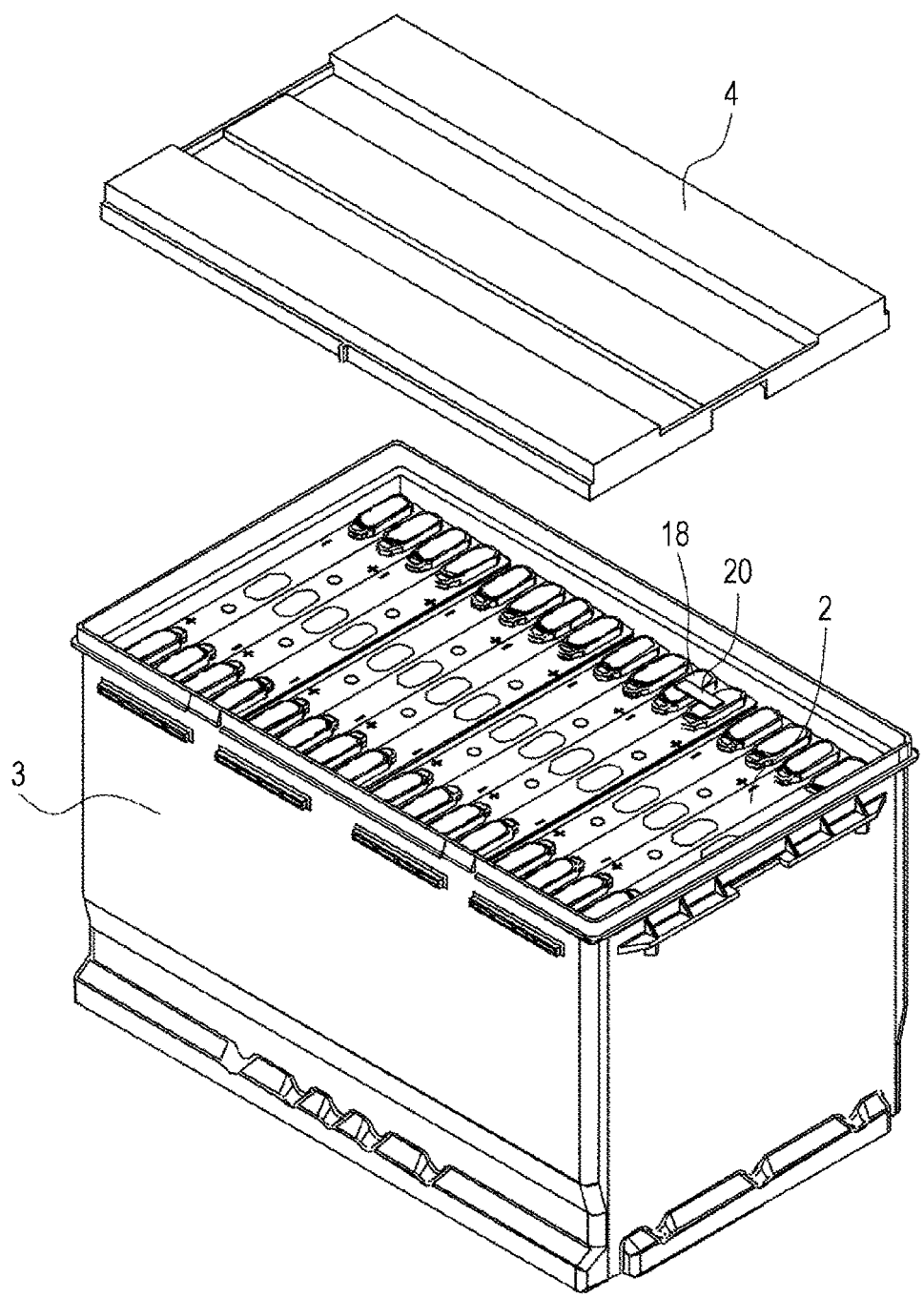
FIG. 10 is a perspective view showing a state where a lid body of an energy storage apparatus according to another embodiment is removed.

For example, as shown in FIG. 10, a plurality of energy storage devices 2 may respectively have terminals 18 on an upper portion thereof, and the terminal 18 mounted on one of the plurality of energy storage devices 2 and the terminal 18 mounted on another one of the plurality of energy storage devices 2 may be connected to each other by a connecting plate 20. In FIG. 10, only two energy storage devices are connected to each other by one connecting plate 20, in an actual use of an energy storage apparatus, it is preferable that all energy storage devices 2 be connected by the connecting plate 20.

With such a configuration, the energy storage devices 2 are positioned at a portion of the outer case 1 on a lower side and hence, there is no obstacle at a portion of the outer case 1 where the energy storage devices 2 are inserted into the outer case 1 whereby an operation of assembling the energy storage devices 2 into the outer case 1 can be performed smoothly. Further, at a portion of the outer case 1 on an upper side, by connecting the plurality of energy storage devices 2 by the connecting plate 20, the energy storage devices 2 can be positioned relative to each other. That is, with the provision of the connecting plate 20, it is possible to overcome a drawback particular to positioning the energy storage device at the portion of the outer case 1 on a lower side that the upper side of the energy storage device 2 cannot be easily fixed. Further, the connecting plate 20 has both a function of a conducting member which electrically connects the energy storage devices 2 to each other, and a function of a fixing member which fixes the energy storage devices 2. Accordingly, it is unnecessary to prepare parts separately whereby the increase of a manufacturing cost can be obviated.

What is claimed is:

1. An energy storage apparatus, comprising:
   an outer case including an opening portion;
   a plurality of energy storage devices arranged in a first direction in the outer case; and
   a positioning projection disposed on opposedly facing inner side surfaces of the outer case; extending in a second direction orthogonal to the first direction toward a lower side of the outer case opposite from the opening portion, and being capable of positioning energy storage devices disposed adjacent to each other at the lower side of the outer case,
   wherein, on the inner side surfaces of the outer case, an aligning projection, which projects in a third direction orthogonal to the first direction and the second direction and is contactable with a short end surface of at least one of the energy storage devices, is formed.

2. The energy storage apparatus according to claim 1, wherein the positioning projection approaches the at least one of the energy storage devices as the positioning projection extends toward the lower side of the outer case.

3. The energy storage apparatus according to claim 2, wherein the positioning projection is configured to increase a pressing force to the at least one of the energy storage devices as the positioning projection extends toward the lower side of the outer case.

4. The energy storage apparatus according to claim 1, wherein the positioning projection is formed at a plurality of portions along the second direction.

5. The energy storage apparatus according to claim 1, wherein the at least one of the energy storage devices has a curved surface on at least a portion of an outer surface thereof, and the positioning projection is brought into contact with the curved surface of the at least one of the energy storage devices.

6. The energy storage apparatus according to claim 1, wherein the at least one of the energy storage devices has a rectangular parallelepiped shape, and side surfaces of the energy storage devices disposed adjacently in the first direction are brought into contact with each other.

7. The energy storage apparatus according to claim 1, wherein the at least one of the energy storage devices has a rectangular parallelepiped shape, the at least one of the energy storage devices includes a curved surface on at least a portion of an outer surface thereof, and the curved surface includes an arcuate surface formed on both end portions of side surfaces of the energy storage devices disposed adjacently in the first direction.

8. The energy storage apparatus according to claim 1, wherein the outer case comprises:
- a body having a bottomed cylindrical shape in which the energy storage devices are accommodated; and
- a lid body which closes an opening portion of the body, the positioning projection being formed on a lower side of the body and the lid body.

9. The energy storage apparatus according to claim 1, wherein the aligning projection is formed on only one of the opposedly facing inner side surfaces of the outer case.

10. The energy storage apparatus according to claim 1, wherein the aligning projection approaches the at least one of the energy storage devices as the aligning projection extends toward the lower side of the outer case.

11. The energy storage apparatus according to claim 1, wherein the aligning projection is formed on a lower half of the inner side surfaces of the outer case.

12. The energy storage apparatus according to claim 1, wherein the at least one of the energy storage devices includes a terminal on an upper portion of the energy storage device, and
    wherein the terminal mounted on one of the energy storage devices and the terminal mounted on another one of the energy storage devices are connected to each other by a connecting plate.

13. The energy storage apparatus according to claim 1, wherein the plurality of energy storage devices are consecutively stacked in the first direction in the outer case.

14. The energy storage apparatus according to claim 1, wherein the aligning projection is disposed on the inner side surfaces of the outer case to contact the short end surface of each of the energy storage devices.

15. The energy storage apparatus according to claim 1, wherein the aligning projection is disposed on only one of the opposedly facing inner side surfaces of the outer case that faces the short end surface of the at least one of the energy storage devices.

16. The energy storage apparatus according to claim 1, wherein the at least one of the energy storage devices includes the short end surface and a long end surface extending in the third direction with a longer length than a length of the short end surface.

17. The energy storage apparatus according to claim 16, wherein the short end surface of the at least one of the energy storage devices faces the aligning projection, and the long end surface of the at least one of the energy storage devices faces one of the inner side surfaces of the outer case that is devoid of the aligning projection.

18. An energy storage apparatus, comprising:
- an outer case including an opening portion;
- a plurality of energy storage devices arranged in a first direction in the outer case; and
- an aligning projection disposed on opposedly facing inner side surfaces of the outer case, extending in a second direction orthogonal to the first direction toward a lower side of the outer ease opposite from the opening portion, the aligning projection projecting in a third direction orthogonal to the first direction and the second direction, and the aligning projection being contactable with a short end surface of at least one of the energy storage devices.

19. The energy storage apparatus according to claim 18, wherein the at least one of the energy storage devices includes the short end surface and a long end surface extending in the third direction with a longer length than a length of the short end surface, and
    wherein the short end surface of the at least one of the energy storage devices faces the aligning projection, and the long end surface of the at least one of the energy storage devices faces one of the inner side surfaces of the outer case that is devoid of the aligning projection.

* * * * *